US011063256B2

(12) United States Patent
Harada et al.

(10) Patent No.: US 11,063,256 B2
(45) Date of Patent: Jul. 13, 2021

(54) ACTIVE MATERIAL, ACTIVE MATERIAL COMPOSITE MATERIAL, ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Yasuhiro Harada, Isehara (JP); Norio Takami, Yokohama (JP); Taro Fukaya, Tokyo (JP); Takuya Iwasaki, Uenohara (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 96 days.

(21) Appl. No.: 16/122,150

(22) Filed: Sep. 5, 2018

(65) Prior Publication Data

US 2019/0296346 A1    Sep. 26, 2019

(30) Foreign Application Priority Data

Mar. 26, 2018    (JP) ............................. JP2018-057375

(51) Int. Cl.
    *H01M 4/485*      (2010.01)
    *H01M 10/0525*    (2010.01)
    (Continued)

(52) U.S. Cl.
    CPC ........... *H01M 4/485* (2013.01); *H01M 4/131* (2013.01); *H01M 4/133* (2013.01); *H01M 4/366* (2013.01);
    (Continued)

(58) Field of Classification Search
    CPC ...... H01M 4/485; H01M 4/131; H01M 4/366; H01M 4/625; H01M 2004/027;
    (Continued)

(56) References Cited

U.S. PATENT DOCUMENTS

2003/0148189 A1*  8/2003  Yamaki ............. H01M 10/0525
                                                    429/324
2010/0233541 A1*  9/2010  Sano .................... H01M 4/5825
                                                    429/221

(Continued)

FOREIGN PATENT DOCUMENTS

JP    2010-287496    12/2010
JP    2012-178352    9/2012

(Continued)

OTHER PUBLICATIONS

Jayaraman et al.; "Exceptional Performance of TiNb2O7 Anode in All One-Dimensional Architecture by Electrospinning"; ACS Appl. Mater. Interfaces 2014, 6, 11, pp. 8660-8666 (available Apr. 25, 2014). (Year: 2014).*

(Continued)

*Primary Examiner* — Gregg Cantelmo
(74) *Attorney, Agent, or Firm* — Oblon, McClelland, Maier & Neustadt, L.L.P.

(57) ABSTRACT

According to one embodiment, an active material is provided. The active material includes particles of a monoclinic niobium titanium composite oxide. The particles include primary particles. The primary particles have an average aspect ratio of 5 or more.

15 Claims, 7 Drawing Sheets

(51) Int. Cl.

| | | |
|---|---|---|
| *H01M 50/519* | (2021.01) | |
| *H01M 4/62* | (2006.01) | |
| *H01M 50/296* | (2021.01) | |
| *H01M 50/509* | (2021.01) | |
| *H01M 50/209* | (2021.01) | |
| *H01M 4/131* | (2010.01) | |
| *H01M 50/249* | (2021.01) | |
| *H01M 4/133* | (2010.01) | |
| *H01M 4/36* | (2006.01) | |
| *H01M 4/66* | (2006.01) | |
| *H01M 10/44* | (2006.01) | |
| *H01M 10/42* | (2006.01) | |
| *H01M 50/20* | (2021.01) | |
| *H01M 50/543* | (2021.01) | |
| *H01M 4/02* | (2006.01) | |
| *B60L 50/51* | (2019.01) | |

(52) U.S. Cl.
CPC .......... *H01M 4/625* (2013.01); *H01M 4/661* (2013.01); *H01M 10/0525* (2013.01); *H01M 10/425* (2013.01); *H01M 10/44* (2013.01); *H01M 50/20* (2021.01); *H01M 50/209* (2021.01); *H01M 50/249* (2021.01); *H01M 50/296* (2021.01); *H01M 50/509* (2021.01); *H01M 50/519* (2021.01); *H01M 50/543* (2021.01); *B60L 50/51* (2019.02); *H01M 2004/021* (2013.01); *H01M 2004/027* (2013.01); *H01M 2004/028* (2013.01); *H01M 2220/20* (2013.01)

(58) Field of Classification Search
CPC .......... H01M 10/0525; H01M 50/209; H01M 50/249; H01M 50/296; H01M 50/509; H01M 50/519
See application file for complete search history.

(56) References Cited

U.S. PATENT DOCUMENTS

| | | | | |
|---|---|---|---|---|
| 2014/0295247 | A1* | 10/2014 | Yoshima | ............... H01M 4/485 429/156 |
| 2015/0079438 | A1* | 3/2015 | Inagaki | ................. H01M 4/366 429/90 |
| 2015/0086872 | A1* | 3/2015 | Ise | ........................ H01M 4/485 429/231.5 |
| 2016/0276662 | A1 | 9/2016 | Ise et al. | |
| 2019/0088942 | A1* | 3/2019 | Ise | ....................... C01G 23/002 |

FOREIGN PATENT DOCUMENTS

| | | | |
|---|---|---|---|
| JP | 2012-186028 A | | 9/2012 |
| JP | 2013-62183 A | | 4/2013 |
| JP | 2014-209449 A | | 11/2014 |
| JP | 2015-159010 | | 9/2015 |
| JP | 5925845 | | 5/2016 |
| JP | 2016-177972 | | 10/2016 |
| JP | 2016219355 A | * | 12/2016 |

OTHER PUBLICATIONS

EPO website (www.espacenet.com) machine translation of JP 2016-219355A. (Year: 2016).*
Madeleine Gasperin, "Affinement de la structure de $TiNb_2O_7$ et repartition des cations," Journal of Solid State Chemistry 53, 1984, pp. 144-147 (with English Abstract).

* cited by examiner

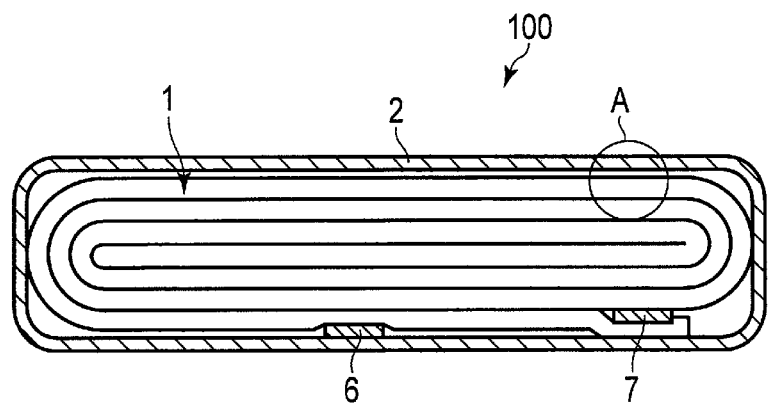
F I G. 3
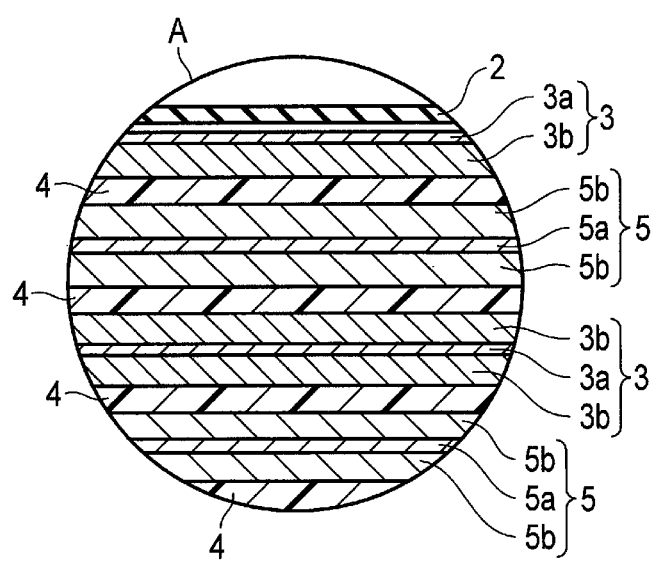
F I G. 4

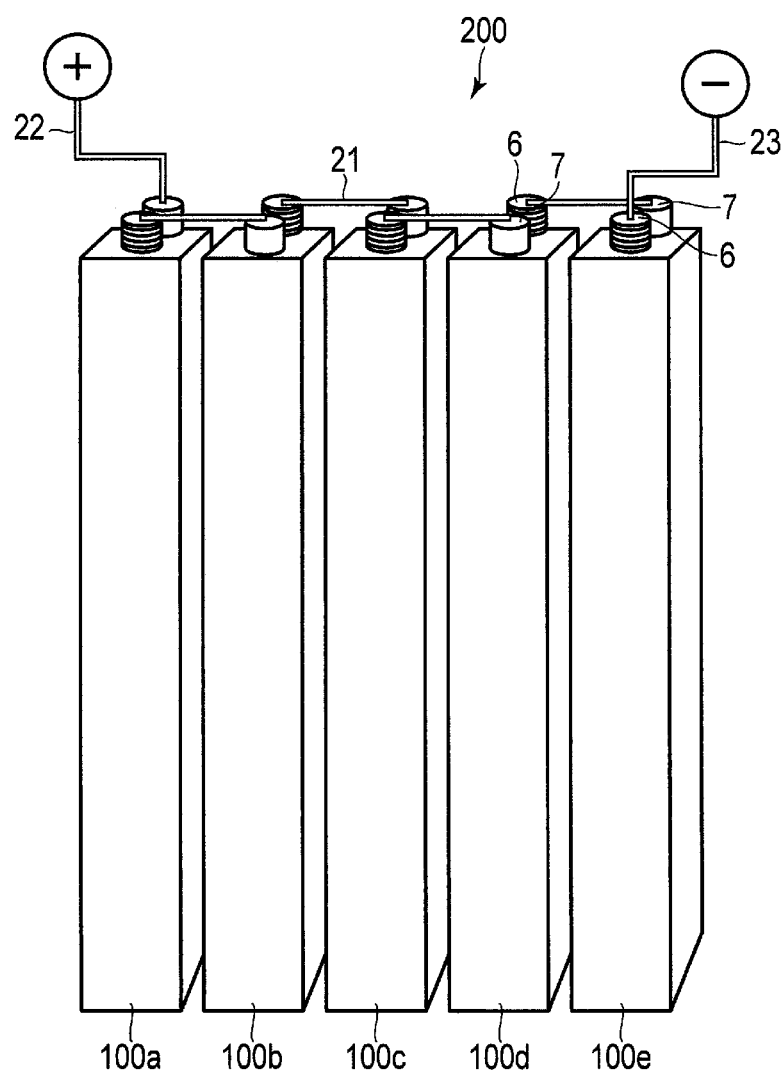
F I G. 7

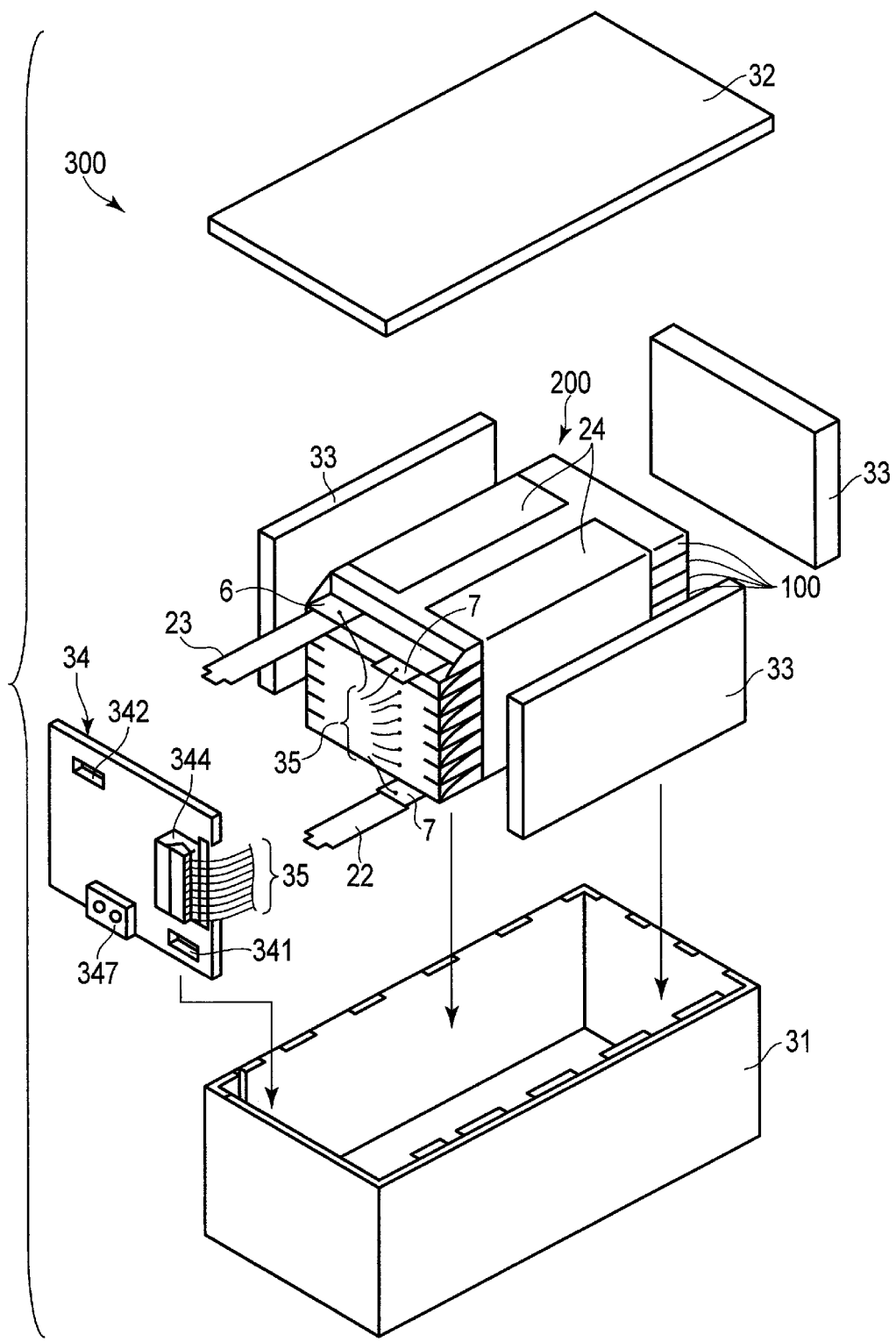
F I G. 8

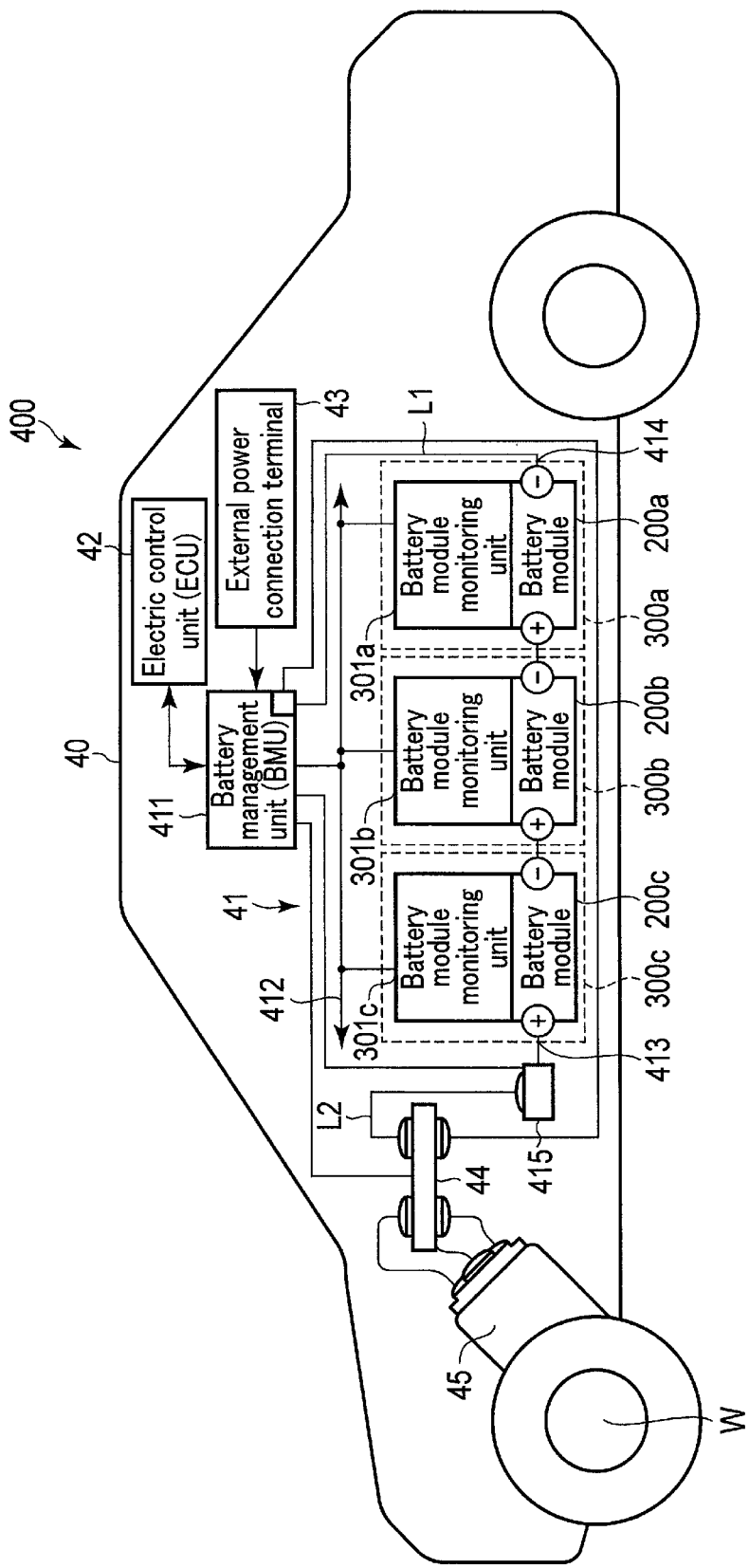
F I G. 11

ACTIVE MATERIAL, ACTIVE MATERIAL COMPOSITE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2018-057375, filed Mar. 26, 2018, the entire contents of which are incorporated herein by reference.

FIELD

Embodiments described herein relate generally to an active material, an active material composite material, an electrode, a secondary battery, a battery pack, and a vehicle.

BACKGROUND

In recent years, a secondary battery such as a lithium-ion secondary battery or a nonaqueous electrolyte secondary battery has been developed as a battery having a high energy density. The secondary battery is expected to be used as a power source for vehicles such as a hybrid automobile and an electric automobile, or as a large-sized power source for power storage. When the secondary battery is used as the power source for vehicles, the secondary battery is required to achieve rapid charge-and-discharge performance and long-term reliability or the like in addition to the high energy density.

Lithium ions and electrons rapidly move through an electrolyte and an external circuit respectively between a positive electrode and a negative electrode which can allow the lithium ions and the electrons to be inserted and extracted, to enable to perform rapid charge-and-discharge. The battery capable of performing rapid charge-and-discharge has the advantage that a charging time is considerably short. When the battery capable of performing rapid charge-and-discharge is used as the power source for vehicles, the motive performances of the automobile can be improved, and the regenerative energy of power can be efficiently recovered.

A carbon-based negative electrode using a carbonaceous material such as graphite as a negative electrode active material is used as a negative electrode which can allow the lithium ions and the electrons to be inserted and extracted. However, when rapid charge-and-discharge is repeated in a battery including the carbon-based negative electrode, dendrites of metal lithium may precipitate on the negative electrode. The dendrites of metal lithium may cause an internal short circuit. Therefore, when the rapid charge-and-discharge is repeated in the battery including the carbon-based negative electrode, a concern is raised that heat generation and ignition may occur.

Therefore, a battery including a negative electrode using a metal composite oxide as the negative electrode active material in place of the carbonaceous material has been developed. In particular, in a battery using a titanium oxide of the metal composite oxide as the negative electrode active material, the dendrites of metal lithium are less likely to precipitate even when rapid charge-and-discharge is repeated as compared with those of the battery including the carbon-based negative electrode. The battery using the titanium oxide has more stable rapid charge-and-discharge and a longer life than those of the battery including the carbon-based negative electrode.

However, the titanium oxide has a higher (nobler) potential relative to lithium metal than that of the carbonaceous material. In addition, the titanium oxide has a lower theoretical capacity per unit mass than that of the carbonaceous material. For this, there is a problem that the battery including a negative electrode using the titanium oxide as the negative electrode active material has a lower energy density than that of the battery including the carbon-based negative electrode.

In view of the above, a new electrode material containing titanium and niobium has been studied. In particular, in a monoclinic niobium-titanium composite oxide represented by $Nb_2TiO_7$, tetravalent titanium ions are reduced to trivalent titanium ions and pentavalent niobium ions are reduced to trivalent niobium ions when lithium ions are inserted. Therefore, this monoclinic niobium-titanium composite oxide can maintain the electric neutrality of a crystal structure even when many lithium ions are inserted, as compared with the titanium oxide. As a result, the monoclinic Nb—Ti composite oxide represented by $Nb_2TiO_7$ has a high theoretical capacity of 387 mAh/g.

BRIEF DESCRIPTION OF THE DRAWINGS

FIG. 3 is a cross-sectional view schematically showing an example of a secondary battery according to the third embodiment;

FIG. 4 is an enlarged cross-sectional view of section A of the secondary battery shown in FIG. 3;

FIG. 7 is a perspective view schematically showing an example of the battery module according to the fourth embodiment;

FIG. 8 is an exploded perspective view schematically showing an example of the battery pack according to the fifth embodiment;

FIG. 11 is a view schematically showing another example of the vehicle according to the sixth embodiment.

DETAILED DESCRIPTION

Figure 1:
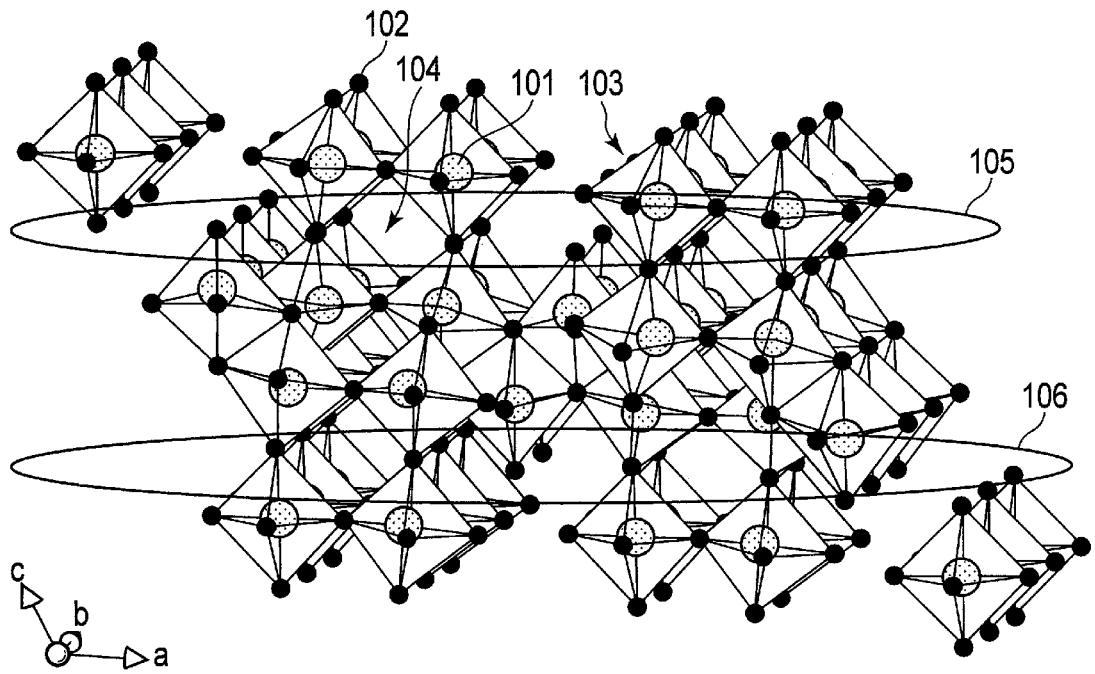
FIG. 1 is a schematic view showing an example of the crystal structure of the monoclinic niobium-titanium composite oxide.

According to one embodiment, an active material is provided. The active material includes particles of a monoclinic niobium titanium composite oxide. The particles include primary particles. The primary particles have an average aspect ratio of 5 or more.

According to another embodiment, an active material composite material is provided. The active material composite material includes the active material according to the embodiment and a carbon body. The carbon body covers at least a portion of surfaces of the particles of the active material.

According to another embodiment, an electrode is provided. The electrode includes the active material according to the embodiment.

According to another embodiment, a secondary battery is provided. The secondary battery includes a negative electrode, a positive electrode, and an electrolyte. The negative electrode is the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

First Embodiment

According to the first embodiment, an active material is provided. The active material includes particles of a monoclinic niobium titanium composite oxide. The particles include primary particles. The primary particles have an average aspect ratio of 5 or more.

The aspect ratio of the primary particle is a ratio L/S of the length L of the major axis of the primary particle to the length S of the minor axis. When the active material having an average aspect ratio of the primary particles is 5 or more, that is, the active material whose primary particle shape is an elongated rod shape is used, the gap between the primary particles can be reduced, thereby increasing the density of the electrodes, as compared to a case in which the active material having the average aspect ratio of the primary particles is lower than 5, that is, the active material whose primary particle shape is more spherical is used.

In addition, as described above, when the active material having the average aspect ratio of the primary particles is 5 or more is used, the electron conductivity of the electrode can be improved. That is, the electrode can include a current collector and an active material-containing layer provided on the current collector. The active material-containing layer contains an active material. When a monoclinic niobium titanium composite oxide is used as the active material, for example, a conductive agent made of fibrous carbon may be disposed between the primary particles so as to increase the electron conductivity. A network of the conductive agent, that is, a conductive path, can be formed by connecting the conductive agent disposed between the primary particles to each other in a reticulated shape. Since the electron conductivity between the primary particles of the active material is increased by forming the conductive path, the input/output characteristics of the battery can be improved. When such a conductive agent made of fibrous carbon and the active material whose aspect ratio of the primary particles is 5 or more are used in combination, the fibrous carbon is easily supported along the major axis direction of the primary particles, and a good conductive path is provided. Therefore, when the active material whose aspect ratio of the primary particles is 5 or more is used, the electron conductivity between the primary particles can be increased.

Furthermore, the active material according to the first embodiment can take the form of the active material composite material. The active material composite material includes the active material according to the first embodiment and a carbon body covering at least a portion of the surfaces of the particles. The carbon body has the function similar to that of the conductive agent. In the active material-containing composite material, since the carbon body covers the surfaces of the primary particles whose average aspect ratio is 5 or more, a better conductive path can be formed. Therefore, when the active material composite material is used, the input/output characteristics of the battery can be improved particularly in a state in which the active material does not insert lithium ions and the electron conductivity is low. In addition, since the conductive agent such as the fibrous carbon described above has a low bulk density, the electrode density can be lowered. Therefore, when the active material composite material containing the active material according to the first embodiment is used, the compounding amount of the conductive agent such as the fibrous carbon can be reduced, and thus the electrode density can be further increased.

Details of the active material according to the first embodiment will be described below.

The active material according to the first embodiment can be an active material for a battery. The active material according to the first embodiment can be used as, for example, a negative electrode active material.

Figure 2:
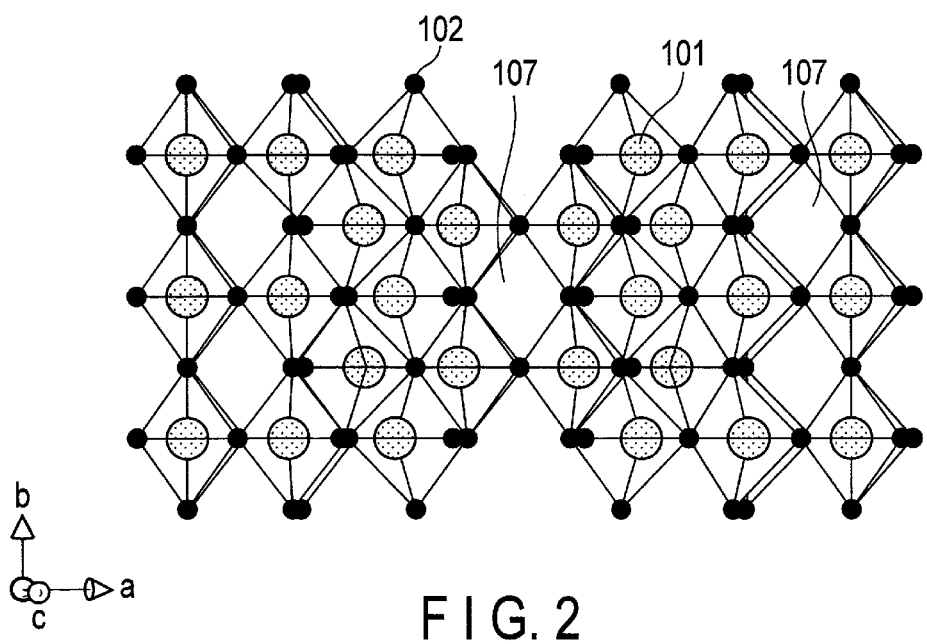
FIG. 2 is a schematic view of the crystal structure shown in FIG. 1 as viewed from another direction.

The active material according to the first embodiment is a monoclinic niobium-titanium composite oxide. The crystal structure of the monoclinic niobium-titanium composite oxide belongs to a space group C2/m. FIG. 1 is a schematic view showing an example of the crystal structure of the monoclinic niobium-titanium composite oxide. FIG. 2 is a schematic view of the crystal structure shown in FIG. 1 as viewed from another direction. FIGS. 1 and 2 show the crystal structure of $Nb_2TiO_7$ as an example of a monoclinic niobium-titanium composite oxide. Referring to FIGS. 1 and 2, an a-axis direction is a direction orthogonal to a b-axis direction, and a c-axis direction is a direction orthogonal to the b-axis direction.

As shown in FIGS. 1 and 2, the crystal structure of $Nb_2TiO_7$ has a configuration in which metal ions 101 and oxide ions 102 constitute a skeleton structure portion 103. In each metal ions 101, niobium (Nb) ions and titanium (Ti) ions are arranged in the ratio of Nb to Ti of 2:1 at random. The skeleton structure portions 103 are alternately arranged three-dimensionally. Vacancies 104 are provided among the skeleton structure portions 103. The vacancies 104 are hosts for lithium ions. The vacancies 104 occupy a large portion with respect to the entire crystal structure as show in FIG. 1. In addition, the vacancies 104 can maintain a structure stably even if lithium ions are inserted.

Each of regions 105 and 106 shown in FIG. 1 has a two-dimensional channel in the [100] direction, that is, the a-axis direction and the [010] direction, that is, the b-axis direction. As shown in FIG. 2, the crystal structure of $Nb_2TiO_7$ has vacancies 107. The vacancies 107 has a tunnel structure which is suitable for conduction of lithium ions. The vacancies 107 is connected to the region 105 and the region 106 as a conductive path. The presence of the conductive path allows the lithium ions to come and go between the region 105 and the region 106.

The crystal structure of the monoclinic niobium-titanium composite oxide shown in FIGS. 1 and 2 has a large space into which the lithium ions are equivalently inserted, and has a structural stability. Additionally, in the crystal structure, a plurality of conductive paths to quickly diffuse lithium ions exist. Therefore, in the crystal structure of the monoclinic niobium-titanium composite oxide, the insertion properties of the lithium ions to the insertion space and the extraction properties of the lithium ions from the insertion space are improved, and the insertion-and-extraction space for the lithium ions is effectively increased. Accordingly, a high capacity and high rate performance can be implemented.

Furthermore, in the above-mentioned crystal structure, when a lithium ion is inserted into the vacancy 104, the metal ion 101 constituting the skeleton structure portion 103 is reduced to trivalent, thereby maintaining the electrical neutrality of the crystal. In the monoclinic niobium-titanium composite oxide, not only the Ti ion is reduced from tetravalent to trivalent, but also the Nb ion is reduced from pentavalent to trivalent. For this, the number of reduced valences per active material weight is large. Therefore, even when a large number of lithium ions are inserted, the electrical neutrality of the crystal can be maintained. For this, the monoclinic niobium-titanium composite oxide has a higher energy density than that of a compound such as a titanium oxide containing only a tetravalent cation. Specifically, the theoretical capacity of the monoclinic niobium-titanium composite oxide is about 387 mAh/g, which is more than twice the value of a titanium oxide having a spinel structure.

The active material according to the first embodiment can be represented by a general formula $Ti_{1-x}M1_xNb_{2-y}M2_yO_7$. In the general formula, $0 \leq x < 1$, and $0 \leq y < 1$ are set. The elements M1 and M2 are respectively at least one selected from the group consisting of V, Ta, Fe, Bi, P, Cr, Mo, W, B, K, Na, Mg, Al, and Si. The elements M1 and M2 may be the same element or may be elements different from each other.

As the element M1, it is preferable to use at least one element of Cr, Fe and Al. These elements are trivalent elements. Therefore, the use of these elements as the element M1 makes it possible to improve the electron conductivity of the monoclinic niobium-titanium composite oxide. Therefore, the use of these elements as the element M1 makes it possible to improve the capacity and rapid charge performance of the battery.

From the viewpoint of improving electron conductivity, it is more preferable to use at least one element selected from the group consisting of V, Ta, Bi and P as the element M1. Since these elements are pentavalent elements, the electron conductivity of the monoclinic niobium-titanium composite oxide can be further improved.

As the element M1, it is preferable to use at least one element selected from the group consisting of B, Na, K, Mg, and Si. The atomic weights of these elements are smaller than the atomic weight of Ti. Therefore, the use of these elements as the element M1 makes it possible to increase the capacity of the battery.

As the element M2, it is preferable to use at least one element selected from the group consisting of Mo, and W. Since these elements are hexavalent elements, the electron conductivity of the monoclinic niobium-titanium composite oxide can be improved.

The use of Ta as the element M2 makes it possible to obtain a monoclinic niobium-titanium composite oxide having the same performance as that in the case of using Nb as the element M2. This is considered to be because Nb and Ta have the same physical, chemical, and electrical properties.

As the elements M1 and M2, at least one element selected from the group consisting of Mo, W, and V may be used. These elements exhibit an effect as a sintering auxiliary agent. Therefore, the use of these elements as at least one of M1 and M2 makes it possible to lower a firing temperature in producing the monoclinic niobium-titanium composite oxide.

The active material according to the first embodiment can also be represented by the general formula $T_{1-x}M_xNb_2O_7$ ($0 \leq x < 1$). M in the general formula is the same as M1 described above.

The content of the elements M1 and M2 in the compound represented by the general formula $Ti_{1-x}M1_xNb_{2-y}M2_yO_7$ and the content of the element M in the compound represented by the general formula $Ti_{1-x}M_xNb_2O_7$ can be quantified, for example, by ICP spectroscopic analysis.

The active material according to the first embodiment may contain an oxide having a composition which is beyond a stoichiometric ratio represented by the general formula $Ti_{1-x}M1_xNb_{2-y}M2_yO_7$ ($0 \leq x < 1$, $0 \leq y < 1$). The oxide can be represented by the general formula $Ti_{1-x}M1_xNb_{2-y}M2_yO_{7+\delta}$ ($0 \leq x < 1$, $0 \leq y < 1$, $-0.3 \leq \delta \leq 0.3$).

That is, during the preparation of the monoclinic niobium-titanium composite oxide, oxygen defects may occur in a raw material or an intermediate product. Inevitable impurities contained in the raw material as well as impurities mixed therein during the preparation may be present in the composite oxide. Due to the unavoidable factor, a monoclinic niobium-titanium composite oxide containing an oxide having a composition beyond a stoichiometric ratio may be prepared in some cases. The oxide having a composition beyond a stoichiometric ratio has excellent lithium ion insertion stability as with an oxide having a composition having a stoichiometric ratio. Therefore, even when the monoclinic niobium-titanium composite oxide contains the oxide having a composition beyond a stoichiometric ratio, the influence on the lithium ion insertion capacity is small.

The monoclinic niobium-titanium composite oxide may contain different phases with different Nb/Ti ratios. Examples of the different phases include Rutile type $TiO_2$, $Nb_{24}TiO_{62}$, $Nb_{14}TiO_{37}$, and $Nb_{10}Ti_2O_{29}$.

As the monoclinic niobium-titanium composite oxide, only one kind of monoclinic niobium-titanium composite oxide particles may be used, and mixtures of a plurality of kinds of monoclinic niobium-titanium composite oxides may be used.

Next, a method for confirming that the active material according to the first embodiment is a monoclinic niobium titanium composite oxide will be described.

In a case in which the active material is contained in the electrode of the battery, first, the following preprocessing is performed.

First, the electrode is extracted from the battery to obtain a measurement sample. At this time, a state close to a state in which lithium ions are completely extracted from the active material in the electrode is set. For example, when the active material is contained in the negative electrode, the battery is in a completely discharged state. For example, the battery can be set to a discharged state by repeating discharging the battery a plurality of times until the rated end voltage or battery voltage reaches 1.0 V at a current of 0.1 C in a 25° C. environment and setting the current value at the time of discharge to 1/100 or less of the rated capacity. Note that although there may be remaining lithium ions even in the discharged state, they do not significantly affect the result of X-ray diffraction measurement described below.

Next, the battery is disassembled under a dry atmosphere such as a glove box filled with argon, and the electrode is extracted. The extracted electrode is washed with an appropriate solvent and subjected to vacuum drying. As the solvent, for example, ethyl methyl carbonate or the like is used. It is confirmed that there is no white precipitate such as lithium salt on the surface of the electrode after washing and drying. In this manner, an electrode sample after washing is obtained.

Next, Powder XRD (X-Ray Diffraction) measurement will be described. By the powder XRD, the crystal structure of the niobium titanium composite oxide included in the active material can be confirmed.

In the powder XRD measurement, first, the electrode sample after cleaning, which is obtained by the above-described method, is cut into almost the same area as the area of the holder of the powder XRD apparatus to obtain a measurement sample. Next, the measurement sample is directly bonded to a glass holder and set in the powder XRD apparatus, and an XRD pattern (X-Ray Diffraction pattern) is acquired using Cu-Kα rays. This diffraction pattern is analyzed by a Rietveld method, thereby confirming the crystal structure of the active material.

As the apparatus of powder XRD measurement, for example, SmartLab available from Rigaku is used. The measurement conditions are as follows.

X-ray source: Cu target
Output: 45 kV, 200 mA
Solar slit: 5° for both incidence and light reception
Step width (2θ): 0.02 deg
Scan speed: 20 deg/min
Semiconductor detector: D/teX Ultra 250
Sample holder: flat glass sample plate holder (thickness: 0.5 mm)
Measurement range: 5°≤2θ≤90°

When another apparatus is used, measurement is performed using a standard Si powder for powder XRD, and measurement is performed after the conditions are adjusted to conditions under which the peak intensity and the peak top position match those of the above apparatus such that the same measurement result as described above can be obtained.

The conditions of the powder XRD measurement are set to conditions that enable to acquire an XRD pattern applicable to Rietveld analysis. To collect data for Rietveld analysis, more specifically, the step width is set to ⅓ to ⅕ of the minimum half-value width of the diffraction peak, and the measurement time or the X-ray intensity is appropriately adjusted such that the intensity at the peak position of the strongest intensity reflection becomes 5,000 cps.

It is desirable to previously grasp the peaks derived from the components other than the active material that can be contained in the electrode. As the components other than the active material, for example, a metal foil that is an electrode current collector, a conductive agent, and a binder are used. Note that when the peak of the current collector and the peak of the active material overlap, it is desirable to peel off the active material-containing layer from the current collector for measurement. This is for separating the overlapping peaks when quantitatively measuring the peak intensity. For example, the active material-containing layer can be peeled off by irradiating the electrode current collector with ultrasonic waves in the solvent.

Note that the powder of the active material is used as the measurement sample, powder XRD measurement is performed by the following method. More specifically, first, the powder of the active material is pulverized until the average particle size becomes about 10 μm. The average particle size can be obtained by, for example, a laser diffraction method.

Next, the pulverized sample is packed in a holder portion that is 0.2 mm deep and is formed on a glass sample plate. As the glass sample plate, for example, a glass sample plate available from Rigaku is used. At this time, take care to sufficiently pack the sample in the holder portion. Also take care not to form a crack, a void, or the like due to insufficient pack of the sample. Next, using another glass plate from the outside, the glass plate is sufficiently pressed against the surface of the sample to flatten it. At this time, take care not to cause unevenness with respect to the reference surface of the holder due to an inappropriate pack amount.

Note that if the orientation of the sample is high, the peak position may be shifted, or the peak intensity ratio may change depending on the manner the sample is packed. For example, an orientation may be recognized from the result of Rietveld analysis to be described later in which the crystal surfaces may be aligned in a specific direction depending on the shapes of the particles when packing the sample. Alternatively, the influence of the orientation may be observed when the measurement sample obtained by extraction from the battery is measured.

For such samples having high orientation, measurements are made using a rotating sample table. When using a rotating sample stage, a sample is placed in a glass capillary and installed in an X-ray diffraction apparatus, and the surface of the sample is measured. The measurement made by such a method can eliminate the difference in the measurement results obtained by the operators and can increase the reproducibility. As the glass capillary, Lindemann glass having a diameter of 2 mm is used.

In a case in which the intensity ratio measured by this method is different from the intensity ratio measured using the flat holder or the glass holder, the influence of orientation is considered, and thus the measurement result using the rotating sample stage is employed.

The method of confirming the composition of the monoclinic niobium titanium composite oxide will be described next. The composition of monoclinic niobium titanium composite oxide can be analyzed using, for example, ICP (Inductively Coupled Plasma) atomic emission spectroscopy.

More specifically, in the electrode sample after cleaning, which is obtained by the above-described method, the current collector and the active material-containing layer are separated. For example, the electrode is put in an ethyl methyl carbonate solution in a glass beaker and vibrated in an ultrasonic cleaning machine, thereby peeling the active material-containing layer from the electrode current collector.

Next, the thus obtained active material-containing layer is heated in the air for a short time (for example, at 500° C. for about 1 hr) to burn off unnecessary portions such as the binder and the conductive agent, thereby obtaining an active material sample. Next, the active material sample is dissolved in an acid, thereby obtaining a liquid sample. As the acid, hydrochloric acid, nitric acid, sulfuric acid, hydrogen fluoride, or the like can be used. Next, the liquid sample is subjected to ICP analysis, thereby confirming the composition of the active material.

The active material according to the first embodiment is, for example, in the form of particles. The active material can be a single primary particle, a secondary particle formed by aggregation of a plurality of primary particles, or a mixture thereof.

The shape of the primary particles of the active material according to the first embodiment is, for example, an elongated columnar shape or prismatic shape. The mean value of the aspect ratios of the primary particles of the active material according to the first embodiment is 5.0 or more, and more preferably 7.0 or more. When the aspect ratio of the primary particles is high, the density and electron conductivity of the electrode tend to increase.

The mean value of the aspect ratios of the primary particles is preferably 25.0 or less. When the mean value of the aspect ratios of the primary particles is 25.0 or less, the slurry viscosity is stabilized at the time of producing the electrode. Therefore, the smoothness of the electrode is improved and the density tends to increase. The aspect ratio of the primary particles is more preferably 14.0 or less.

The aspect ratio of the primary particles can be obtained by, for example, the following method. First, the washed electrode sample obtained by the above-described method is prepared. Next, the electrode sample is photographed with a scanning electron microscope (SEM) at a magnification of, for example, 5000 times to 50000 times, which clearly shows the primary particles. Next, the primary particles whose entirety is visible are selected from the primary particles appearing on the SEM image. Next, the primary particles approximate to an ellipse. In this approximation, the ratio between the major axis and the minor axis of the ellipse is set such that the difference between the outline of the primary particles and the outline of the circumference of the ellipse becomes the smallest. Next, the lengths of the major axis and the minor axis of the ellipse are measured. The thus obtained lengths of the major axis and the minor axis of the ellipse can be regarded as the lengths of the major axis and the minor axis of the primary particles, respectively. Similar operations are performed on 50 SEM images randomly selected, and the arithmetic mean value L of the lengths of the major axes of the primary particles and the arithmetic mean value S of the lengths of the major axes of the primary particles are calculated. The ratio L/S of the arithmetic mean value L of the thus obtained lengths of the major axes of the primary particles to the arithmetic mean value S of the lengths of the minor axes is defined as the average aspect ratio of the primary particles.

The average length L of the major axes of the primary particles is preferably 2.0 µm to 50.0 µm. When the length of the major axis of the primary particle is within this range, there is a tendency that both the improvement of the conductive path in the electrode and the improvement of the electrode density can be achieved at the same time. The average length L of the major axes of the primary particles is more preferably 4.0 µm to 20.0 µm.

The average length S of the minor axes of the primary particles is preferably 0.4 µm to 10.0 µm. When the length of the minor axis of the primary particle is within this range, it tends to promptly take lithium ions from the particle surface. The average length S of minor axes of the primary particles is more preferably 0.8 µm to 4.0 µm.

The primary particles of the active material according to the first embodiment preferably contain a crystallite corresponding to a (020) plane. That is, the primary particles according to the first embodiment preferably extend in a b-axis direction shown in FIGS. 1 and 2, that is, in a [010] direction. When the active material containing the primary particles extending in the [010] direction is used as described above, the lithium conductivity in the crystal tends to be improved.

The size of the crystallite corresponding to the (020) plane of the active material according to the first embodiment is preferably 60 nm or more, and more preferably 90 nm or more. When the crystallite size corresponding to the (020) plane of the active material is large, the Coulomb efficiency at the time of charge and discharge tends to be improved.

The size of the crystallite corresponding to the (020) plane of the active material according to the first embodiment is preferably 150 nm or less, and more preferably 110 nm or less. When the crystallite size corresponding to the (020) plane of the active material is small, the diffusibility of lithium ions tends to increase.

The size of the crystallite corresponding to the (020) plane of the active material can be calculated from the X-ray diffraction pattern obtained by the above-described method. That is, in the X-ray diffraction pattern obtained by the above-described method, the peak appearing within the range of the incident angle of 470° to 48.5° is a peak corresponding to the (020) plane of the primary particle. Therefore, the crystallite size corresponding to the (020) plane can be calculated by using a full width at half maximum of the peak and a Scherrer equation.

The mean secondary particle size of the active material according to the first embodiment is preferably 1 µm to 50 µm. When the mean secondary particle size of the active material falls within this range, the productivity at the time of manufacture of the electrode can be improved, and a battery of satisfactory performance can be obtained. The mean secondary particle size of the active material is measured by the following method. In the method, using a laser diffraction type distribution measuring apparatus (Shimadzu SALD-300 or an apparatus having a function equivalent thereto), first, about 0.1 g of a sample, a surfactant, and 1 mL to 2 mL of distilled water are added to a beaker and sufficiently stirred, the mixture is poured into a stirring tank, a light intensity distribution is measured 64 times at 2 second intervals, and the particle size distribution data is analyzed.

The BET specific surface area of the active material according to the first embodiment is desirably 1.0 $m^2/g$ to 120 $m^2/g$, more desirably 2.0 $m^2/g$ to 50 $m^2/g$. When an active material with a large specific surface area is used, the discharge rate characteristics of the battery can be improved. In addition, when an active material with a low specific surface area is used, the life characteristic of the battery can be improved, and in an electrode manufacturing step to be described later, the coating properties of a slurry containing the active material can be improved.

Next, the active material composite material containing the active material according to the first embodiment will be described. As described above, the active material composite material includes the active material according to the first embodiment and a carbon body covering at least a portion of the surfaces of the primary particles.

The carbon body covers at least a portion of the surfaces of the primary particles of the monoclinic niobium titanium composite oxide. The carbon body preferably evenly covers the entire surfaces of the primary particles of the monoclinic niobium titanium composite oxide. The carbon body may have a film shape or may have a particle shape.

The carbon body is a porous body that allows lithium ions and a nonaqueous solvent contained in a nonaqueous electrolyte to permeate. The electron conductivity of the carbon body is higher than the electron conductivity of the monoclinic niobium titanium composite oxide particles. Hence, when the carbon body is supported, the electron conductivity of the active material can be increased. The carbon bodies supported on the respective primary particles can contact each other to form conductive paths between the primary particles.

The thickness of the carbon body is preferably 1 nm to 10 nm, and more preferably 2 nm to 10 nm. If the carbon body is excessively thick, diffusion of lithium ions tends to be impeded, and the internal resistance tends to rise. In addition, if the carbon body is excessively thin, the effect of raising the electron conductivity tends to be low.

The state and thickness of the carbon body can be confirmed with transmission electron microscopy (TEM) observation. Specifically, first, ruthenium is adsorbed on the surfaces of the active material particles by an evaporation method. Then, the active material particles are embedded in a resin, and the resin is thinned by ion milling using DualMill 600 manufactured by GATAN. Then, primary particles of arbitrary active material particles are subjected to TEM observation. This observation allows the dispersibility of the carbon body on the active material particles to be grasped. 10 or more particles are subjected to the observation, and the mean value of the thickness of the carbon body is calculated as the thickness of the carbon body. As a TEM apparatus, for example, H-9000UHR III manufactured by Hitachi, Ltd. can be used. In this measurement, an accelerating voltage is set to 300 kV, and an image magnification is set to a 2000000-fold magnification.

The amount of carbon body in the active material composite material preferably ranges from 0.1 mass % to 5 mass % and, more preferably, ranges from 0.2 mass % to 3 mass %.

The amount of carbon body in the active material composite material can be measured by an inorganic element analysis method. That is, first, an active material sample prepared is put in an alumina crucible together with a combustion improver and burnt in an oxygen airflow by high frequency induction heating. At this time, since carbon is emitted as carbon dioxide. Hence, by detecting the carbon dioxide by an infrared detector, the carbon amount can be determined. As the measurement apparatus, for example, CS844 available from LECO can be used.

Next, an example of a method of manufacturing an active material according to the first embodiment will be described. The active material according to the first embodiment can be produced by, for example, a solid phase synthesis method.

Specifically, first, a raw material powder is prepared by mixing an oxide containing titanium, an oxide or a hydroxide containing niobium, and a flux so as to have a target composition. A compound containing an arbitrary element may be further added to the raw material powder. As the oxide containing titanium or niobium, for example, titanium dioxide or niobium pentoxide can be used. As the compound of each element, for example, hydroxide, sulfide, oxide, salt, or a mixture thereof can be used.

The flux (sintering auxiliary agent) serves as a catalyst to promote crystallization of titanium and niobium, and promotes growth in a specific plane direction. That is, when such a flux is not added, the primary particles of the monoclinic niobium titanium composite oxide are isotropically grown, so that its shape can be an amorphous block shape. On the other hand, primary particles with high aspect ratio can be obtained by adding a flux that promotes growth only on a specific surface. Potassium ion (K+), phosphate ion ($PO_4^-$), and molybdenum (Mo) in the raw material powder function as such a flux. As the potassium ion source, for example, potassium carbonate or potassium chloride is used. As the phosphate ion source, for example, phosphoric acid ($H_3PO_4$) is used. As the molybdenum source, for example, molybdenum trioxide ($MoO_3$) or molybdic acid is used. The flux may be added at the time of pulverizing the powder after first calcination described later.

When the flux is used, the element may be incorporated into the crystal structure of the monoclinic niobium titanium composite oxide to be synthesized. That is, a portion of niobium and titanium in the crystal structure of the monoclinic niobium titanium composite oxide can be replaced by potassium, phosphorus, and molybdenum. This is because potassium, phosphorus, and molybdenum are diffused in the raw material molten by the flux and remain on the crystal face.

However, it is possible to remove the water-soluble compounds of potassium, phosphorus and molybdenum remaining in the crystal by washing the powder after second main calcination described later with water.

Next, the raw material mixture is calcined at a temperature of 600° C. to 800° C. If the preliminary calcination is performed, it is possible to improve the reactivity between raw material powders by decomposing salts and hydroxides contained in the raw materials. After the preliminary calcination, pulverization using a ball mill is preferably performed. The raw materials are more uniformly mixed by the pulverization treatment, and the desired crystal phase can be easily obtained.

Next, the powder after the preliminary calcination is transferred to a platinum crucible and used for the first main calcination. In the first main calcination, the calcination temperature is preferably 900° C. to 1,500° C., and the calcination time is preferably 1 hour to 5 hours. The intended crystalline phase can be obtained by performing the first main calcination. The powder obtained after the first main calcination is preferably pulverized again using a ball mill. By the pulverization treatment, the primary particles are divided and the crystal growth of the specific surface is easily promoted.

Next, the powder is subjected to second main calcination to obtain the active material. In the second calcination treatment, calcination is preferably performed in the air for a long time. Specifically, the temperature increase rate is, for example, 1° C./min to 10° C./min, and preferably 2° C./min to 5° C./min. In addition, the calcination temperature is, for example, 1,000° C. to 1,800° C., and preferably 1,100° C. to 1,400° C. In addition, the calcination time at the calcination temperature is, for example, 5 hours to 60 hours, and preferably 10 hours to 20 hours. The powder obtained after the second calcination is more preferably cooled rapidly on a platinum plate. The growth of a specific surface can be accelerated by rapid cooling treatment. The active material precursor is calcined under such a condition to obtain the active material with high aspect ratio of primary particles.

Next, the obtained active material is sufficiently washed with pure water or the like. This is for removing water-soluble residues or impurities contained in the added flux. Due to the washing treatment, a niobium-titanium composite oxide containing substantially no flux components such as potassium, phosphorus, and molybdenum in a chemical formula can be obtained. The washing treatment can be omitted, but in this case, there is a high possibility that water-soluble residues or impurities contained in the flux component will be incorporated in the active material as an impurity element.

Next, a method of producing the above-mentioned active material composite material will be described.

First, a carbon source and pure water are mixed and sufficiently stirred to prepare a carbon source aqueous solution. As the carbon source, sugars such as sucrose, maltose and glucose, polyolefins, nitriles, alcohols such as polyvinyl alcohol (PVA), organic compounds containing a benzene ring, aromatic hydrocarbons such as pyrene, naphthalene and chrysene, or mixtures thereof can be used. As the carbon source, PVA is preferably used. The use of the PVA as the carbon source tends to provide an improvement in the dispersibility of the carbon body on the surfaces of the monoclinic niobium titanium composite oxide particles.

Next, the carbon source aqueous solution and the active material particles obtained by the above-described method are mixed to prepare a dispersion. The amount of the carbon source relative to 100 parts by mass of the active material is preferably 1 part by mass to 15 parts by mass, and more preferably 2 parts by mass to 10 parts by mass.

Next, the dispersion is subjected to spray drying to obtain a powder sample. Next, the obtained powder sample is further dried at a temperature of 70° C. to 200° C. for 1 min to 1 hr. In this manner, a secondary particulate active material containing primary particles supporting an unfired carbon body is obtained.

Next, the secondary particulate active material is subjected to calcination under an inert atmosphere, and carbonization is performed. As the gas for the inert atmosphere, for example, nitrogen gas, carbon dioxide gas, argon gas, or the like can be used. The calcination time is, for example, 1 hour to 5 hours. The calcination temperature is preferably 650° C. to 850° C., and more preferably 700° C. to 800° C. If the calcination temperature is high, the crystallinity of the carbon body tends to rise. The active material composite material can be obtained in this way. The active material composite material may be in the form of secondary particles.

According to the above described first embodiment, an active material is provided. The active material is particles of a monoclinic niobium titanium composite oxide whose average aspect ratio of primary particles is 5 or more. Therefore, when the active material according to the first embodiment is used, the electrode density and electron conductivity can be increased.

Second Embodiment

According to a second embodiment, an electrode is provided. The electrode according to the second embodiment includes the active material according to the first embodiment. The active material may be in the form of the above-described active material composite material. The electrode according to the second embodiment may be a battery electrode. The electrode according to the second embodiment can be used as, for example, a negative electrode.

The electrode according to the second embodiment may include a current collector and an active material-containing layer. The active material-containing layer can be formed on one side or both sides of the current collector. The active material-containing layer can contain an active material, and optionally a conductive agent and a binder.

The active material-containing layer may include one kind of the active material according to the first embodiment or two or more kinds of the active materials according to the first embodiment. In addition, the active material-containing layer can include a mixture of one or more kinds of the active material according to the first embodiment and one or more kinds of other active materials.

For example, when the active material according to the first embodiment is included as a negative electrode active material, examples of the other active material include a lithium titanate having a ramsdellite structure (for example, $Li_{2+y}Ti_3O_7$ (0≤y≤3), a lithium titanate having a spinel structure (for example, $Li_{4+x}Ti_5O_{12}$ (0≤x≤3)), monoclinic titanium dioxide ($TiO_2$), anatase type titanium dioxide, rutile type titanium dioxide, a hollandite type titanium composite oxide, and an orthorhombic titanium composite oxide.

Examples of the orthorhombic titanium composite oxide includes a compound represented by a general formula of $Li_{2+a}M(I)_{2-b}Ti_{6-c}M(II)_dO_{14+\sigma}$. M(I) is at least one element selected from the group consisting of Sr, Ba, Ca, Mg, Na, Cs, Rb, and K. M(II) is at least one element selected from the group consisting of Zr, Sn, V, Nb, Ta, Mo, W, Y, Fe, Co, Cr, Mn, Ni, and Al. In the general formula, 0≤a≤6, 0≤b<2, 0≤c<6, 0≤d<6, −0.5≤σ≤0.5. Specific examples of the orthorhombic titanium composite oxide include $Li_{2+a}Na_2Ti_6O_{14}$ (0≤a≤6).

The conductive agent may be blended to improve current collection performance and to suppress the contact resistance between the negative electrode active material and the current collector. Examples of the conductive agent include vapor grown carbon fiber (VGCF), carbon black such as acetylene black, and carbonaceous materials such as graphite. One of these may be used as the conductive agent, or two or more thereof may be used in combination as the conductive agent. Alternatively, in place of using the conductive agent, a carbon coating or an electron conductive inorganic material coating may be applied to the surfaces of the negative electrode active material particles.

The binder may be blended to fill the gaps of the dispersed active material with the binder and also to bind the active material and the negative electrode current collector. Examples of the binder include polytetrafluoro ethylene (PTFE), polyvinylidene fluoride (PVdF), fluorine-containing rubber, styrene-butadiene rubber, a polyacrylic acid compound, an imide compound, carboxymethyl cellulose (CMC) and salts of the CMC. One of these may be used as the binder, or two or more thereof may be used in combination as the binder.

The content of the active material, the conductive agent, and the binder in the active material-containing layer may be appropriately changed depending on its application of the electrode. For example, if the electrode is used as the negative electrode of the secondary battery, it is preferable that the negative electrode active material, the conductive agent, and the binder are respectively blended at rates of 68% by mass to 96% by mass, 2% by mass to 30% by mass, and 2% by mass to 30% by mass. The content of the conductive agent of 2% by mass or more makes it possible to improve the current collection performance of the active material-containing layer. The amount of the binder of 2% by mass or more provides sufficient binding property between the active material-containing layer and the current collector, which can provide promising excellent cycle performance. On the other hand, the contents of the conductive agent and binder are preferably 30% by mass or less, thereby increasing the capacity.

The density of the active material-containing layer is preferably 2.50 g/cm³ to 3.50 g/cm³. The electrode, in which the density of the active material-containing layer is within this range, is excellent in terms of energy density and holding property of the electrolyte. The density of the active material-containing layer is preferably 2.60 g/cm³ to 3.00 g/cm³.

The density of the active material-containing layer, that is, the electrode density not including the current collector, can be obtained by, for example, the following method.

First, the electrode sample after washing is obtained by the above-described method. Next, a portion of the electrode sample is punched out into, for example, a square shape with a side of 5 cm to obtain a measurement sample. Next, the thicknesses of five points in the central portion and four corners of the measurement sample are measured to obtain a mean thickness T1. Next, the thickness (T1-T2) of the active material-containing layer is obtained by subtracting the thickness T2 of the current collector from the mean thickness T1. Next, the mass M1 of the electrode sample is measured. Next, the mass (M1-M2) of the active material-containing layer is obtained by subtracting the mass M2 of the current collector from the mass M1 of the electrode sample. The mass W of the active material-containing layer per unit area is calculated from the mass (M1-M2). Next, the density of the active material-containing layer can be obtained by dividing the mass W of the active material-containing layer by the thickness (T1-T2) of the active material-containing layer.

The current collector is a material which is electrochemically stable at the insertion and extraction potentials of lithium ions of the active material. For example, if the active material is used as the negative electrode active material, the current collector is preferably made of copper, nickel, stainless, aluminum, or an aluminum alloy containing one or more elements selected from Mg, Ti, Zn, Mn, Fe, Cu, and Si. The thickness of the current collector is preferably 5 μm to 20 μm. The current collector having such a thickness can achieve a balance between the strength and reduction in weight of the electrode.

In addition, the current collector can include a portion on one side where the negative electrode active material-containing layer is not carried on any surfaces. This portion can act as a negative electrode tab.

The electrode can be produced by, for example, the following method. First, an active material, a conductive agent, and a binder are suspended in a solvent to prepare a slurry. The slurry is applied onto one surface or both of reverse surfaces of a current collector. Next, the applied slurry is dried to form a layered stack of the active material-containing layer and the current collector. Then, the layered stack is subjected to pressing. The electrode can be produced in this manner.

Alternatively, the electrode may also be produced by the following method. First, an active material, a conductive agent, and a binder are mixed to obtain a mixture. Next, the mixture is formed into pellets. Then, the electrode can be obtained by arranging the pellets on the current collector.

The electrode according to the second embodiment includes the active material according to the first embodiment. For this reason, the electrode according to the second embodiment can implement high density and electron conductivity.

Third Embodiment

According to a third embodiment, a secondary battery including a negative electrode, a positive electrode and an electrolyte is provided. The secondary battery includes the electrode according to the second embodiment as the negative electrode.

The secondary battery according to the third embodiment can further include a separator disposed between the positive electrode and the negative electrode. The positive electrode, the negative electrode, and the separator can constitute an electrode group. The electrolyte may be held in the electrode group.

The secondary battery according to the third embodiment can further include a container member housing the electrode group and the electrolyte.

Furthermore, the secondary battery according to the third embodiment can further include a positive electrode terminal electrically connected to the positive electrode and a negative electrode terminal electrically connected to the negative electrode.

The secondary battery according to the third embodiment may be a lithium secondary battery. The secondary battery includes nonaqueous electrolyte secondary battery containing a nonaqueous electrolyte.

Hereinafter, the negative electrode, the positive electrode, the electrolyte, the separator, the container member, the positive electrode terminal, and the negative electrode terminal will be described in detail.

1) Negative Electrode

The negative electrode can include a negative electrode current collector and a negative electrode active material-containing layer. The negative electrode current collector and the negative electrode active material-containing layer can be the current collector and the active material-containing layer described concerning the electrode according to the second embodiment, respectively. The negative electrode active material-containing layer contains the active material according to the first embodiment as a negative electrode active material.

The negative electrode can be produced by, for example, the method similar to the method of producing the electrode according to the second embodiment.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include compounds capable of having Li (lithium) and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x<1$), lithium manganese nickel composite oxides having a spinel structure (e.g., $Li_xMn_{2-y}Ni_yO_4$; $0<x\leq1$, $0<y\leq2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, y+z<1). The positive electrode potential can be made high by using these positive electrode active materials.

When an room temperature molten salt is used as the nonaqueous electrolyte of the battery, preferred examples of the positive electrode active material include lithium iron phosphate, $Li_xVPO_4F$ (0≤x≤1), lithium manganese composite oxide, lithium nickel composite oxide, and lithium nickel cobalt composite oxide. Since these compounds have low reactivity with room temperature molten salts, cycle life can be improved. The room temperature molten salt will be described later in detail.

The primary particle size of the positive electrode active material is preferably within a range of from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably within a range of from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carbokymethyl cellulose (CMC), and salts of the CMC. One of these may be used as the binder, or two or more may be used in combination as the binder.

The conductive agent is added to improve a current collection performance and to suppress the contact resistance between the active material and the current collector. Examples of the conductive agent include vapor grown carbon fiber (VGCF), carbon black such as acetylene black, and carbonaceous substances such as graphite. One of these may be used as the conductive agent, or two or more may be used in combination as the conductive agent. The conductive agent may be omitted.

In the positive electrode active material-containing layer, the positive electrode active material and binder are preferably blended in proportions within ranges of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When a conductive agent is added, the positive electrode active material, binder, and conductive agent are preferably blended in proportions of 77% by mass to 95% by mass, 2% by mass to 20% by mass, and 3% by mass to 15% by mass, respectively.

When the amount of the conductive agent is 3% by mass or more, the above-described effects can be expressed. By setting the amount of the conductive agent to 15% by mass or less, the proportion of conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably within a range of from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector can include a portion on one side where the positive electrode active material-containing layer is not carried on any surfaces. This portion acts as a positive electrode current collector tab.

The positive electrode can be produced by, for example, the method similar to the method of producing the electrode according to the second embodiment.

3) Electrolyte

As the electrolyte, for example, a liquid nonaqueous electrolyte or a gel nonaqueous electrolyte may be used. The liquid nonaqueous electrolyte is prepared by dissolving an electrolyte salt in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), bistrifluoromethylsulfonylimide lithium (LiTFSI; $LiN(CF_3SO_2)_2$), and mixtures thereof. The electrolyte salt is preferably less likely to be oxidized even at high potentials, and $LiPF_6$ is most preferred.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, the nonaqueous electrolyte may be, for example, a room temperature molten salt (ionic melt) including lithium ions, a polymer solid electrolyte, or an inorganic solid electrolyte, other than the liquid nonaqueous electrolyte or the gel nonaqueous electrolyte.

The electrolyte may be an aqueous electrolyte. The aqueous electrolyte contains an aqueous solvent and an electrolyte salt. The aqueous electrolyte may be a liquid. A liquid aqueous electrolyte is prepared by dissolving the electrolyte salt serving as a solute in the aqueous solvent. The electrolyte salt may be the same as the electrolyte salt described above.

As the aqueous solvent, a solution containing water can be used. Here the solution containing water may be pure water or a solvent mixture of water and an organic solvent.

The room temperature molten salt (ionic melt) means compounds which may exist in a liquid state at normal temperature (15 to 25° C.) among organic salts constituted of combinations of organic cations and anions. The room temperature molten salts include those which singly exist in a liquid state, those which are put into a liquid state when mixed with an electrolyte, those which are put into a liquid state when dissolved with an organic solvent, and mixture thereof. Generally, the melting point of the room temperature molten salt used in a secondary battery is 25° C. or less. Further, the organic cation generally has a quaternary ammonium skeleton.

The polymer solid electrolyte is prepared by dissolving the electrolyte salt in a polymeric material, and solidifying it.

The inorganic solid electrolyte is a solid substance having lithium ion conductivity.

4) Separator

The separator may be made of, for example, a porous film or synthetic resin nonwoven fabric including polyethylene, polypropylene, cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can be properly selected depending on battery size or intended use of the battery.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 4.5 V (vs. Li/Li$^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

FIG. 3 is a cross-sectional view schematically showing an example of a secondary battery according to the third embodiment. FIG. 4 is an enlarged cross-sectional view of section A of the secondary battery shown in FIG. 3.

The secondary battery 100 shown in FIGS. 3 and 4 includes a bag-shaped container member 2 shown in FIG. 3, an electrode group 1 shown in FIGS. 3 and 4, and an electrolyte, which is not shown. The electrode group 1 and the electrolyte are housed in the bag-shaped container member 2. The electrolyte (not shown) is held in the electrode group 1.

The bag shaped container member 2 is made of a laminate film including two resin layers and a metal layer sandwiched between the resin layers.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and a negative electrode active material-containing layer 3b. The active material according to the first embodiment is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 5:
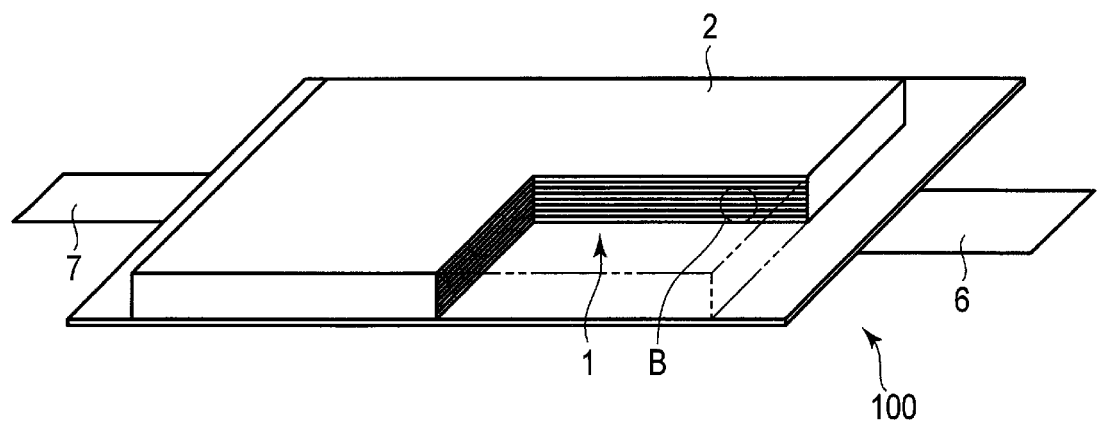
FIG. 5 is a partially cut-out perspective view schematically showing another example of a secondary battery according to the third embodiment.
Figure 6:
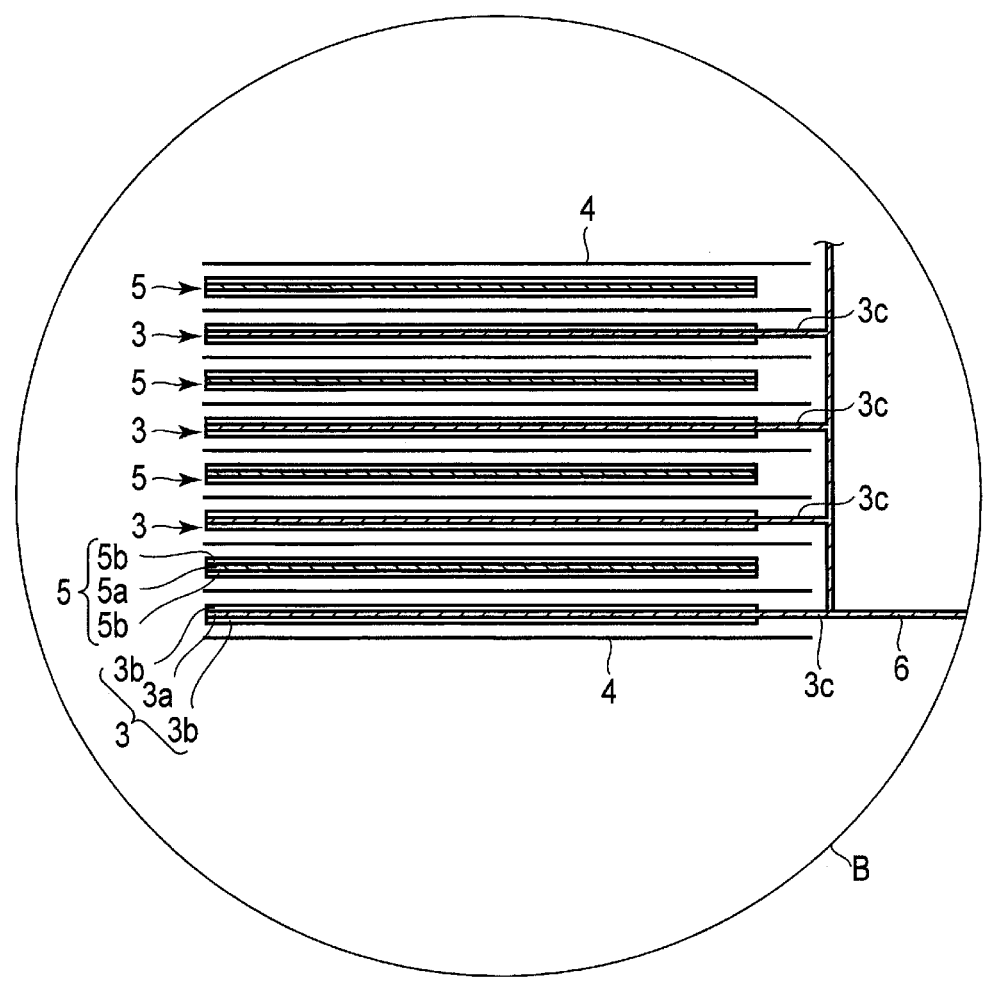
FIG. 6 is an enlarged cross-sectional view of section B of the secondary battery shown in FIG. 5.

The secondary battery according to the third embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the third embodiment. FIG. 6 is an enlarged cross-sectional view of section B of the secondary battery shown in FIG. 5.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 6, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3 c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the third embodiment includes the electrode according to the second embodiment. Therefore, the secondary battery according to the third embodiment can implement high energy density and low internal resistance.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

FIG. 7 is a perspective view schematically showing an example of the battery module according to the fourth embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the third embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 7 is a battery module of five in-series connection.

As shown in FIG. 7, the positive electrode terminal 7 of the single-battery 100a located at one end on the left among the row of the five single-batteries 100a to 100e is connected to the positive electrode-side lead 22 for external connection. In addition, the negative electrode terminal 6 of the single-battery 100e located at the other end on the right among the row of the five single-batteries 100a to 100e is connected to the negative electrode-side lead 23 for external connection.

The battery module according to the fourth embodiment includes the secondary battery according to the third embodiment. Therefore, the battery module according to the fourth embodiment can implement high energy density and low internal resistance.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 9:
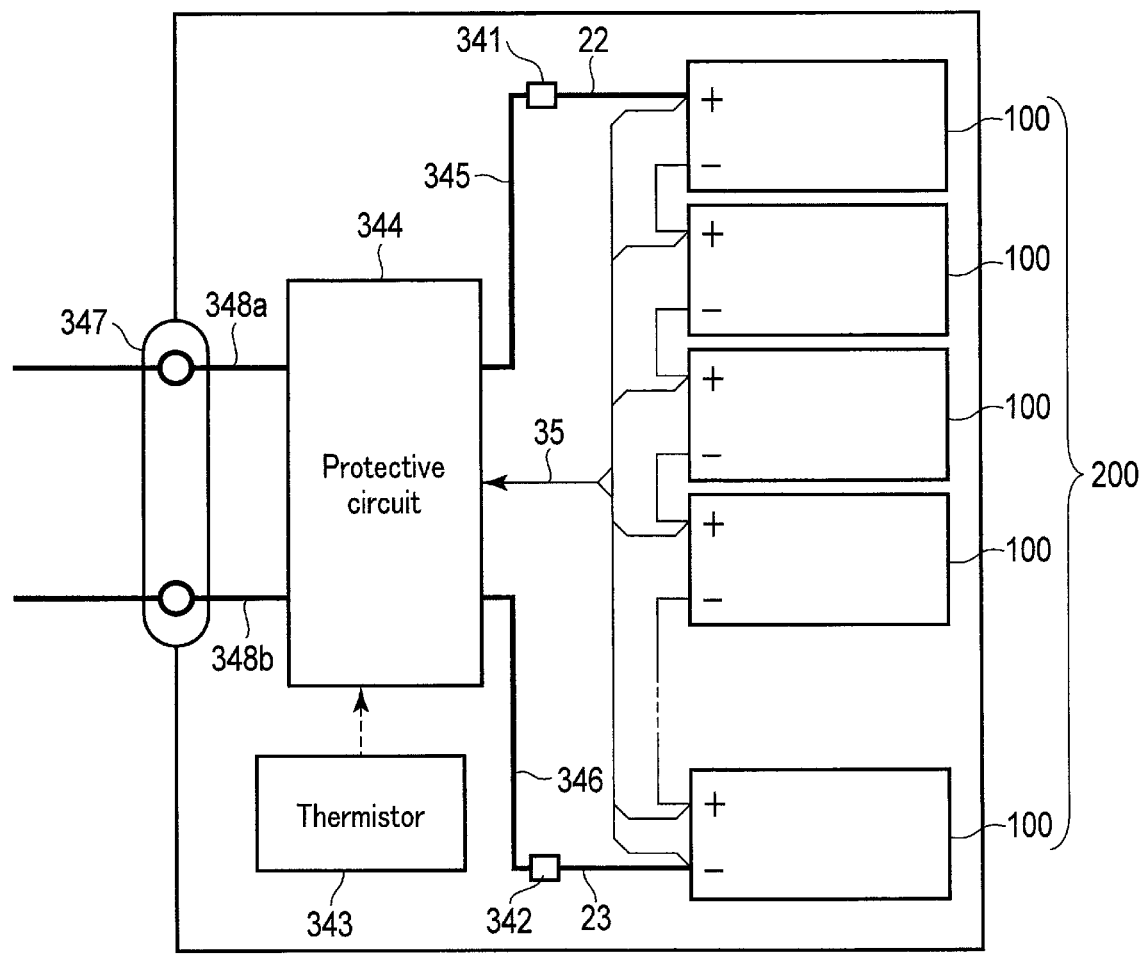
FIG. 9 is a block diagram showing an example of an electric circuit of the battery pack shown in FIG. 8.

FIG. 8 is an exploded perspective view schematically showing an example of the battery pack according to the fifth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

A single-battery 100 has a structure shown in FIGS. 5 and 6. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the fifth embodiment includes the secondary battery according to the third embodiment or the battery module according to the fourth embodiment. Therefore, the battery pack according to the fifth embodiment can implement high energy density and low internal resistance.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle according to the sixth embodiment can include a mechanism configured to convert kinetic energy of the vehicle into regenerative energy.

Examples of the vehicle according to the sixth embodiment include two- to four-wheeled hybrid electric automobiles, two- to four-wheeled electric automobiles, electric assist bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

The vehicle according to the sixth embodiment may have plural battery packs installed. In such a case, the battery packs may be electrically connected in series, electrically connected in parallel, or electrically connected in a combination of in-series connection and in-parallel connection.

An example of the vehicle according to the sixth embodiment is explained below, with reference to the drawings.

Figure 10:
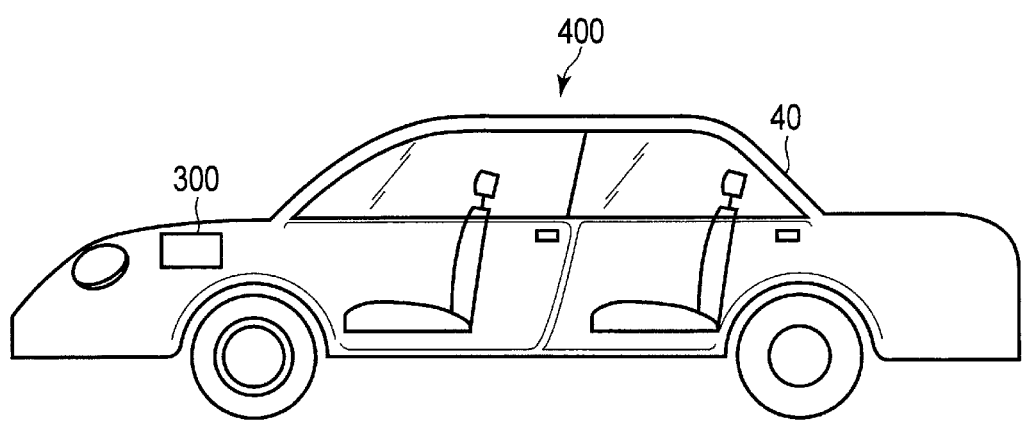
FIG. 10 is a cross-sectional view schematically showing an example of a vehicle according to the sixth embodiment.

FIG. 10 is a cross-sectional view schematically showing an example of a vehicle according to the sixth embodiment.

A vehicle 400, shown in FIG. 10 includes a vehicle body 40 and a battery pack 300 according to the fifth embodiment. In FIG. 10, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 10, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Next, with reference to FIG. 11, an aspect of operation of the vehicle according to the sixth embodiment is explained.

FIG. 11 is a view schematically showing another example of the vehicle according to the sixth embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment includes the battery pack according to the fifth embodiment. Therefore, the vehicle according to the sixth embodiment can implement high traveling performance.

EXAMPLES

Examples of the present invention will be described below. However, the present invention is not limited to the examples to be described below.

Example 1

(Preparation of Active Material Particles)

First, titanium dioxide and niobium pentoxide were mixed at a molar ratio of 1:1 to prepare a raw material mixed powder. Next, potassium chloride was added as a flux in an amount of 0.2 wt % based on the raw material mixed powder and was mixed.

Next, the mixture was preliminarily calcined at 650° C. for 12 hours, then transferred to a platinum crucible, and subjected to the first main calcination. In the first main calcination, the preliminarily calcined powder was calcined at 1,150° C. for 2 hours, and then pulverized again for 1 hour using a ball mill. The powder was subjected to second main calcination to obtain an active material. In the second main calcination, the temperature increase rate was set to 10° C./mi, and the calcination temperature was set to 1,400° C. for 10 hours. The obtained active material was sufficiently washed with pure water.

(Preparation of Active Material Composite Material Particles)

Next, the active material particles obtained by the above described method were made to support a carbon body, thereby obtaining active material composite material particles. More specifically, first, polyvinyl alcohol (PVA) and pure water were mixed to prepare a PVA solution. The concentration of PVA in the PVA solution was 15 mass %. Then, the active material particles were added to the PVA solution and stirred to prepare a dispersion. Next, the dispersion was subjected to spray drying to obtain a powder sample. Next, the powder sample was further dried at a temperature of 100° C. for 12 hours, thereby obtaining active material particles supporting an unfired carbon body. Next, the active material particles were carbonized under a reducing atmosphere at a temperature of 700° C. for 1 hour, thereby obtaining powder of the active material composite material particles.

(Production of Electrode)

An electrode was produced in the following way.

First, 100 parts by mass of active material, 6 parts by mass of conductive agent, and 4 parts by mass of binder were dispersed in a solvent to prepare a slurry. As the active material, the active material composite material particles obtained by the above described method were used. As the conductive agent, a mixture of acetylene black and graphite was used. In the mixture, the mass ratio of acetylene black and graphite was 1:2. As the binder, a mixture of carboxymethyl cellulose (CMC) and styrene butadiene rubber (SBR) was used. In the mixture, the mass ratio of CMC and SBR was 1:1. As the solvent, pure water was used.

Next, the obtained slurry was applied to one surface of a current collector, and the coating was dried, thereby forming an active material-containing layer. As the current collector, an aluminum foil having a thickness of 12 μm was used. Then, the current collector and the active material-containing layer were pressed to obtain an electrode. The pressing pressure was common to Examples and Comparative Examples. The weight of the electrode per unit area was 60 g/m$^2$.

(Production of Nonaqueous Electrolyte)

An electrolyte salt was dissolved in an organic solvent, thereby obtaining a liquid nonaqueous electrolyte. As the electrolyte salt, LiPF$_6$ was used. The mol concentration of LiPF$_6$ in the nonaqueous electrolyte was 1 mol/L. As the organic solvent, a solvent mixture of ethylene carbonate (EC) and diethyl carbonate (DEC) was used. The volume ratio of EC and DEC was 1:2.

(Preparation of Cell)

The electrode obtained by the above described method was used as a working electrode, a metal lithium foil was used as a counter electrode and a reference electrode, and the nonaqueous electrolyte prepared by the above described method was used, thereby producing a three electrode beaker cell.

In this Example, since the metal lithium is used as the counter electrode in a three-electrode type beaker cell for measurement, the electrode potentials of Example and Comparative Example are nobler than the counter electrode and therefore operate as a positive electrode. Therefore, the definitions of charge and discharge are opposite when the electrodes of Example and Comparative Example are used as the negative electrode. In order to avoid confusion, in this Example, the direction in which lithium ions are inserted into the electrode is unified by the name of discharge, and the direction in which lithium ions are extracted is unified by the name of charging. Note that the electrode active material of the present embodiment is combined with a known positive electrode material and operates as a negative electrode.

Example 2

An active material was obtained in accordance with the procedure similar to that described in Example 1 except that the first calcination temperature was changed from 1,150° C. to 1,000° C., the second calcination temperature was changed from 1,400° C. to 1,150° C., and the second calcination time was changed from 10 hours to 5 hours. A cell was produced in accordance with the procedure similar to that described in Example 1 except that the active material was used.

Example 3

An active material was obtained in accordance with the procedure similar to that described in Example 1 except that molybdenum trioxide ($MoO_3$) was used as a flux in place of potassium chloride, the first calcination time was changed from 2 hours to 3 hours, the second calcination temperature was changed from 1,400° C. to 1,250° C., and the second calcination time was changed from 10 hours to 8 hours. A cell was produced in accordance with the procedure similar to that described in Example 1 except that the active material was used.

Example 4

An active material was obtained in accordance with the procedure similar to that described in Example 1 except that a mixture of potassium chloride and molybdenum trioxide was used as a flux, the second calcination temperature was changed from 1,400° C. to 1,350° C., and the second calcination time was changed from 10 hours to 20 hours. A cell was produced in accordance with the procedure similar to that described in Example 1 except that the active material was used. In the mixture of potassium chloride and molybdenum trioxide, the molar ratio between potassium chloride and molybdenum trioxide was 1:1.

Example 5

An active material was obtained in accordance with the procedure similar to that described in Example 1 except that tantalum pentoxide ($Ta_2O_5$), vanadium pentoxide ($V_2O_5$), and bismuth (III) oxide ($Bi_2O_3$) were further added to the raw material mixed powder, the first calcination temperature was changed from 1,150° C. to 1,000° C., the second calcination temperature was changed from 1,400° C. to 1,150° C., and the second calcination time was changed from 10 hours to 4 hours. A cell was produced in accordance with the procedure similar to that described in Example 1 except that the active material was used.

Example 6

An active material was obtained in accordance with the procedure similar to that described in Example 1 except that a mixture of potassium chloride and phosphoric acid ($H_3PO_4$) was used as a flux, silicon oxide ($SiO_2$) was further added to the raw material mixed powder, the first calcination temperature was changed from 1,150° C. to 1,000° C., the second calcination temperature was changed from 1,400° C. to 1,150° C., and the second calcination time was changed from 10 hours to 5 hours. A cell was produced in accordance with the procedure similar to that described in Example 1 except that the active material was used.

Example 7

An active material was obtained in accordance with the procedure similar to that described in Example 1 except that a mixture of potassium chloride and molybdenum trioxide mixed at a molar ratio of 1:10 was used as a flux, sodium carbonate ($Na_2CO_3$), magnesium oxide (MgO), and tungsten trioxide ($WO_3$) were further added to the raw material mixed powder, the first calcination time was changed from 2 hours to 3 hours, the second calcination temperature was changed from 1,400° C. to 1,250° C., the second calcination time was changed from 10 hours to 6 hours, and water washing treatment of the active material was omitted. A cell was produced in accordance with the procedure similar to that described in Example 1 except that the active material was used.

Example 8

An active material was obtained in accordance with the procedure similar to that described in Example 1 except that a mixture of potassium chloride and molybdenum trioxide at a molar ratio of 1:10 was used as a flux, chromium trioxide ($CrO_3$), iron oxide (III) ($Fe_2O_3$), aluminum oxide ($Al_2O_3$), and boron oxide ($B_2O_3$) was further added to the raw material mixed powder, the first calcination time was changed from 2 hours to 3 hours, the second calcination temperature was changed from 1,400° C. to 1,350° C., the second calcination time was changed from 10 hours to 6 hours, and water washing treatment of the active material was omitted. A cell was produced in accordance with the procedure similar to that described in Example 1 except that the active material was used.

Comparative Example 1

An active material was obtained in accordance with the procedure similar to that described in Example 1, except that the addition of flux was omitted, the first calcination time was changed from 2 hours to 5 hours, and the second calcination was omitted. A cell was produced in accordance with the procedure similar to that described in Example 1 except that the active material was used.

Comparative Example 2

First, a mixed acid solution was prepared by mixing a dilute sulfuric acid solution containing titanyl sulfate, an ethanol solution containing niobium chloride, and molybdic acid. In the mixed acid solution, the molar ratio between titanium and niobium was 3:7. Molybdic acid was added so as to be 0.26 atm %. Then, ammonia water was gradually added to the mixed acid solution until the pH reached 8, thereby obtaining a coprecipitation product. Next, the solution containing the coprecipitation product was transferred to an autoclave container and subjected to heat treatment at a temperature of 160° C. for 5 hours. Next, the coprecipitation product was extracted from the solution after the heat treatment and washed using pure water. Next, the coprecipitation product after the washing was freeze-dried to remove the solvent, thereby obtaining a powder of the active material precursor. When X ray diffraction measurement was performed for the active material precursor, a halo peak was observed in the XRD pattern. That is, the crystal structure of the active material precursor was an amorphous structure.

Next, the active material precursor was placed in a heating furnace, heated from the room temperature up to a calcination temperature of 900° C. at a temperature increase rate of 20° C./min in the atmosphere, and calcined by maintaining the temperature for 30 min. In this manner, a powdered active material was obtained. A cell was produced in accordance with the procedure similar to that described in Example 1 except that the active material was used.

<Evaluation Method>

(ICP Analysis)

ICP analysis was performed for the active materials obtained in Examples and Comparative Examples. The results are shown in Table 2.

(X Ray Diffraction Measurement)

X ray diffraction measurement was performed for the active materials obtained in Examples and Comparative Examples by the above described method. As a result, the crystal structures of the active materials obtained in Examples and Comparative Examples were the same as monoclinic.

(Calculation of Aspect Ratios of Primary Particles)

For the active materials obtained in Examples and Comparative Examples, the lengths of the major axes and the minor axes of the primary particles were measured by the above-described method, and the aspect ratios were calculated. The result is shown in Table 2.

(Calculation of Crystallite Size)

For the active materials obtained in Examples and Comparative Examples, the crystallite sizes corresponding to the (020) plane were calculated by the above-described method. The result is shown in Table 2.

(Measurement of Electrode Density)

For the electrodes obtained in Examples and Comparative Examples, the densities of the active material-containing layers were calculated by the above-described method. The result is shown in Table 2.

(Measurement of Electrode Resistance)

For the electrodes obtained in Examples and Comparative Examples, the electrode resistances were measured by a method complying with a four-terminal measurement system defined by Japanese Industrial Standards JIS H 0602 (1995). Specifically, first, an arbitrary portion of the electrode was cut out into a square shape to obtain a test piece. The length of one side of the test piece was 5 cm, and ten test pieces were taken. Next, resistance values from both opposite ends of the test piece were measured using a four-terminal measurement system. This operation was performed for ten test pieces, and the arithmetic mean value thereof was calculated to obtain the electrode resistance. The result is shown in Table 2.

(Evaluation of Battery Characteristics)

For the cells according to Examples and Comparative Examples, the initial discharge capacities were measured. Specifically, for the cells, first, Li was inserted at a temperature of 25° C. until the battery voltage reached 0.6 V at a charge current of 0.2 C. After that, Li was discharged at a discharge current of 1.0 C until the battery voltage reached 3.0 V. The discharge capacity at this time was measured to obtain the initial 1 C discharge capacity. The result is shown in Table 2.

Table 1 and 2 summarize data relating to Examples and Comparative Examples.

TABLE 1

| | Manufacturing method | | | |
|---|---|---|---|---|
| | Flux | First calcination temperature (° C.) | First calcination time (hours) | Second calcination temperature (° C.) | Second calcination time (hours) |
| Example 1 | KCl | 1150 | 2 | 1400 | 10 |
| Example 2 | KCl | 1000 | 2 | 1150 | 5 |
| Example 3 | MoO$_3$ | 1150 | 3 | 1250 | 8 |
| Example 4 | KCl + MoO$_3$ | 1150 | 2 | 1350 | 20 |
| Example 5 | KCl | 1000 | 2 | 1150 | 4 |
| Example 6 | KCl + H$_3$PO$_4$ | 1000 | 2 | 1150 | 5 |
| Example 7 | KCl + MoO$_3$ | 1150 | 3 | 1250 | 6 |
| Example 8 | KCl + MoO$_3$ | 1150 | 3 | 1350 | 6 |
| Comparative Example 1 | None | 1150 | 5 | — | — |
| Comparative Example 2 | Mo acid | 900 | 0.5 | — | — |

TABLE 2

| | Active material | | | | | Electrode characteristics | | Battery characteristics |
|---|---|---|---|---|---|---|---|---|
| | Chemical formula | Crystallite size (nm) | Minor axis (μm) | Major axis (μm) | Aspect ratio | Density (g/cm$^3$) | Resistance (Ω · sq) | 1 C discharge capacity (mAh/g) |
| Example 1 | Nb$_2$TiO$_7$ | 148.9 | 9.71 | 49.50 | 5.10 | 2.50 | 12.3 | 268.9 |
| Example 2 | Nb$_2$TiO$_7$ | 94.5 | 0.85 | 5.95 | 7.00 | 2.65 | 10.1 | 269.1 |
| Example 3 | Nb$_2$TiO$_7$ | 108.5 | 2.03 | 28.00 | 13.79 | 2.81 | 9.5 | 269.5 |
| Example 4 | Nb$_2$TiO$_7$ | 60.3 | 0.41 | 10.24 | 24.98 | 3.03 | 8.6 | 270.4 |
| Example 5 | Nb$_{1.97}$Ta$_{0.01}$V$_{0.01}$Bi$_{0.01}$TiO$_7$ | 85.3 | 1.21 | 6.38 | 5.27 | 2.61 | 8.2 | 271.6 |
| Example 6 | Nb$_{1.99}$K$_{0.01}$Ti$_{0.95}$P$_{0.04}$Si$_{0.01}$O$_7$ | 82.9 | 1.47 | 8.59 | 5.84 | 2.68 | 8.5 | 274.8 |
| Example 7 | Nb$_{1.98}$Na$_{0.01}$Mg$_{0.01}$Ti$_{0.93}$Mo$_{0.04}$W$_{0.03}$O$_7$ | 71.6 | 3.58 | 32.90 | 9.19 | 2.85 | 9.1 | 271.3 |

TABLE 2-continued

| | Active material | | | | | Electrode characteristics | | Battery characteristics |
| --- | --- | --- | --- | --- | --- | --- | --- | --- |
| | | Crystallite size (nm) | Minor axis (μm) | Major axis (μm) | Aspect ratio | Density (g/cm³) | Resistance (Ω · sq) | 1 C discharge capacity (mAh/g) |
| | Chemical formula | | | | | | | |
| Example 8 | $Nb_{1.7}Mo_{0.3}Ti_{0.7}Cr_{0.05}Fe_{0.05}Al_{0.1}B_{0.1}O_7$ | 101.7 | 3.98 | 47.65 | 11.97 | 2.70 | 7.9 | 272.7 |
| Comparative Example 1 | $Nb_2TiO_7$ | 70.3 | 1.25 | 1.36 | 1.09 | 2.41 | 35 | 253.9 |
| Comparative Example 2 | $Nb_2TiO_7$ | 29.5 | 1.23 | 4.67 | 3.80 | 2.34 | 31 | 264.7 |

In Table 1, of the columns under the heading "manufacturing method", a column with a notation "flux" describes the type of the added flux. In addition, a column with a notation "first calcination temperature (° C.)" and a column with a notation "first calcination time (hours)" describe the temperature and the time at the time of first calcination, respectively. In addition, a column with a notation "second calcination temperature (° C.)" and a column with a notation "second calcination time (hours)" describe the temperature and the time at the time of second calcination, respectively.

In Table 2, of columns under the heading "active material", a column with a notation "chemical formula" describes the chemical formula of the synthesized active material. In addition, a column with a notation "crystallite size (nm)" describes the crystallite size corresponding to the (020) plane of the active material obtained by the above-described method. In addition, a column with a notation "major axis (μm)" describes the mean value of the lengths of the major axes of the primary particles of the active material obtained by the above-described method. In addition, a column with a notation "minor axis (μm)" describes the mean value of the lengths of the minor axes of the primary particles of the active material obtained by the above-described method. In addition, a column with a notation "aspect ratio" describes the value obtained by dividing the mean value of the lengths of the major axes by the mean value of the lengths of the minor axes.

In addition, of columns under the heading "electrode characteristics", a column with a notation "density (g/cm³)" describes the density of the active material-containing layer. In addition, a column with a notation "resistance (Ω·sq)" describes the resistance of the electrode.

In addition, of columns under the heading "battery characteristics", a column with a notation "1 C discharge capacity (mAh/g)" describes the initial 1 C discharge capacity.

As shown in Table 2, the electrode density, the electric resistance, and the 1 C discharge capacity according to Examples 1 to 8 in which the aspect ratios of the primary particles were 5 or more were higher than the electrode density, the electric resistance, and the 1 C discharge capacity according to Comparative Examples 1 and 2 in which the aspect ratios of the primary particles were lower than 5.

According to at least one embodiment described above, an active material is provided. The active material is particles of a monoclinic niobium titanium composite oxide whose average aspect ratio of primary particles is 5 or more. Therefore, when the active material according to the first embodiment is used, the electrode density and electron conductivity can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising particles of a monoclinic niobium titanium composite oxide, which comprise primary particles having an average aspect ratio of 5 or more,
    wherein the monoclinic niobium titanium composite oxide is represented by a general formula $Ti_{1-x}M1_xNb_{2-y}M2_yO_7$:
    in the general formula, 0<x<1 and 0<y<1 are set, each of the elements M1 and M2 is at least one selected from the group consisting of V, Ta, Fe, Bi, P, Cr, Mo, W, B, K, Na, Mg, Al, and Si, and the elements M1 and M2 are the same element or are elements different from each other,
    wherein a size of a crystallite corresponding to a (020) plane is from 60 nm to 110 nm, and the (020) plane is represented by a peak appearing within a range of 2θ of 47° to 48.5° in a powder X-ray diffraction pattern using CuKα rays.

2. The active material according to claim 1, wherein an average length of major axes of the primary particles is from 2.0 μm to 50.0 μm.

3. The active material according to claim 1, wherein an average length of minor axes of the primary particles is from 0.4 μm to 10.0 μm.

4. An active material composite material comprising:
    the active material according to claim 1; and
    a carbon body covering at least a portion of surfaces of particles of the active material.

5. The active material according to claim 1, wherein the average aspect ratio is from 5 to 25.

6. An electrode comprising the active material according to claim 1.

7. An electrode comprising the active material composite material according to claim 4.

8. A secondary battery comprising:
    the electrode according to claim 6 as a negative electrode;
    a positive electrode; and
    an electrolyte.

9. A battery pack comprising the secondary battery according to claim 8.

10. The battery pack according to claim 9, further comprising:
    an external power distribution terminal; and
    a protective circuit.

11. The battery pack according to claim 9, which includes plural of the secondary battery, wherein the plural of the secondary battery are electrically connected in series, in parallel, or in combination of series and parallel.

12. A vehicle comprising the battery pack according to claim 9.

13. The vehicle according to claim 12, which comprises a mechanism configured to convert kinetic energy of the vehicle into regenerative energy.

14. The active material according to claim 1, wherein the average aspect ratio is from 11.97 to 25.

15. The active material according to claim 1, wherein in the general formula, each of the elements M1 and M2 is at least one selected from the group consisting of Ta, Mo, W, and V.

* * * * *